United States Patent [19]
Benjamin

[11] Patent Number: 4,852,436
[45] Date of Patent: Aug. 1, 1989

[54] CAM-CONTROLLED TURNING MACHINE

[75] Inventor: Roland J. Benjamin, Park Ridge, Ill.

[73] Assignee: Hughes Aircraft Company, Los Angeles, Calif.

[21] Appl. No.: 121,390

[22] Filed: Nov. 16, 1987

[51] Int. Cl.$^4$ ................................................ B23B 3/28
[52] U.S. Cl. ......................................... 82/19; 82/1 C; 82/12; 82/14 R
[58] Field of Search ................. 82/1 C, 12, 14 R, 19

[56] References Cited

U.S. PATENT DOCUMENTS

| | | | |
|---|---|---|---|
| 1,028,036 | 5/1912 | Lee | 82/19 X |
| 3,079,732 | 3/1963 | Rawstron et al. | 82/14 R |
| 3,983,769 | 10/1976 | McConnell et al. | 82/14 R |
| 4,333,368 | 6/1982 | Watt | 82/12 X |
| 4,592,684 | 6/1986 | Baker | 82/1 C X |

FOREIGN PATENT DOCUMENTS 1477723  5/1969  Fed. Rep. of Germany .......... 82/19

*Primary Examiner*—Eugene R. Laroche
*Assistant Examiner*—Nathan McCutcheon
*Attorney, Agent, or Firm*—William J. Streeter; Mark J. Meltzer

[57] ABSTRACT

Apparatus and method is disclosed for forming an elliptical surface in a mirror 10. The mirror blank is rotated about a given axis and the cutting tool tip 24 is pivoted about an axis C which is generally perpendicular to and spaced from the workpiece axis 16. As the cutting tip 24 moves in an arcuate path about point C the instantaneous radius R between the cutting tip and the C axis is adjusted by way of a linkage 34 which translates movement generated by a cam surface 36 and follower arm 32 into horizontal movement of the tool cutting tip 24.

10 Claims, 2 Drawing Sheets

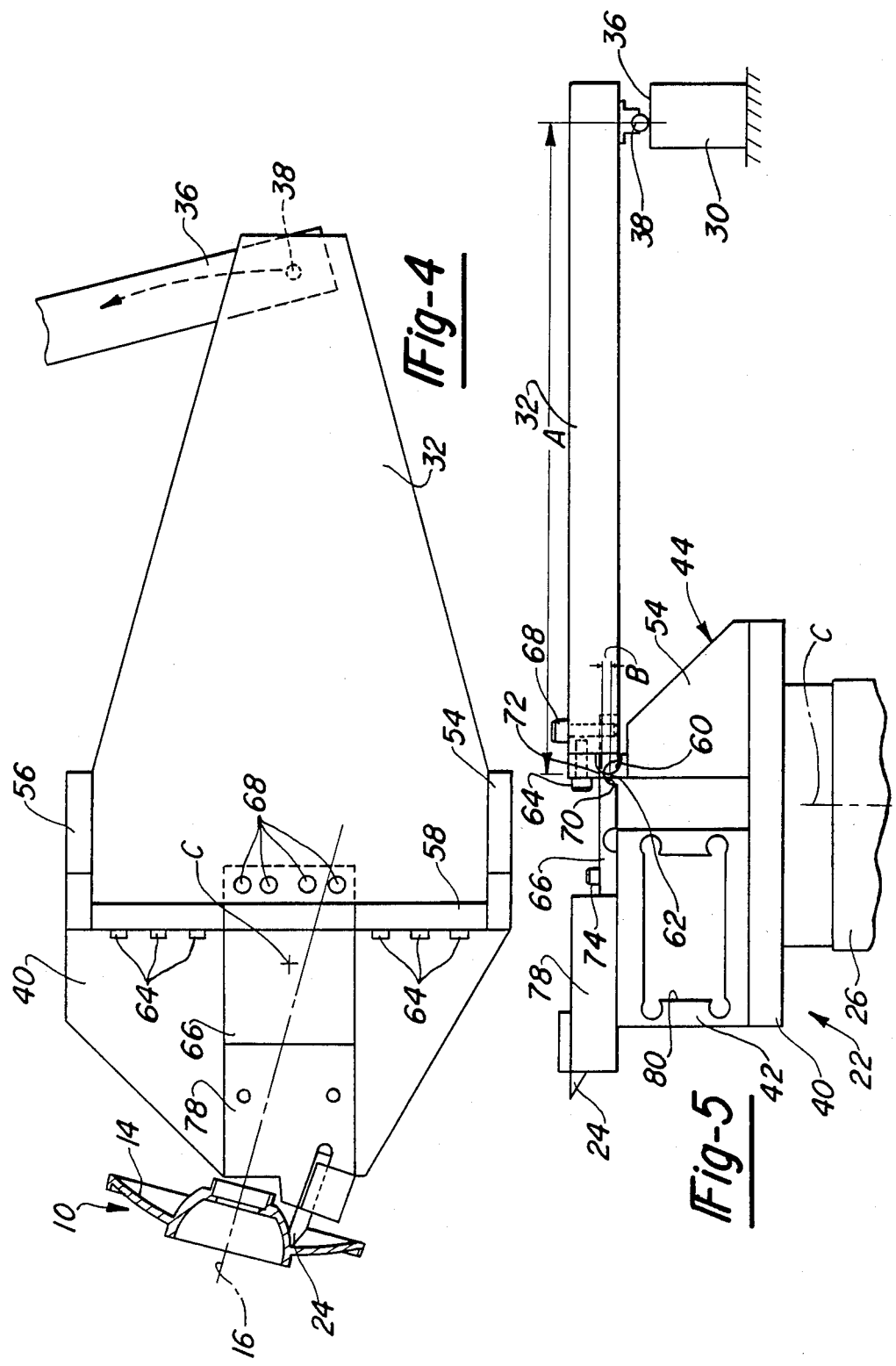

CAM-CONTROLLED TURNING MACHINE

BACKGROUND OF THE INVENTION

1. Technical Field

This invention relates to machines for removing material from workpieces and, more particularly, to turning machines.

2. Discussion

The trend in modern-day machine shops is to employ sophisticated numerically-controlled machine tools. These tools provide the user with substantial flexibility yet are relatively expensive. On the other hand, special purpose machines that are specifically designed to perform a given task may be more cost effective where high volume production of the same part is expected. Whichever approach is used, it is a relatively difficult task to machine aspheric surfaces such as elliptical mirrors as compared to the comparatively easier task of machining spherical surfaces.

The present invention is directed to providing a cost effective machine for making parts such as mirrors with aspheric surfaces.

SUMMARY OF THE INVENTION

According to the teachings of the preferred embodiment, a workpiece holder assembly is used to rotate a surface of the workpiece about a given axis. A tool holder assembly includes a tool with a cutting tip mounted on one end thereof for removing material from the workpiece. The tool assembly is pivotable about a pivot axis extending generally perpendicular to and spaced from the axis of rotation of the workpiece. The cutting tip moves in an arcuate path having a given instantaneous radius measured from the pivot axis. Means are provided for adjusting the radius as the tool tip moves in this arcuate path to thereby form an aspheric surface in the workpiece. In the disclosed embodiment, this adjustment is provided by way of a fixed cam surface having a generally sinusoidal configuration cooperating with a linkage assembly which translates variations in the cam surface into changes in the instantaneous cutting tool radius as a cam follower rides along the cam surface during pivotable movement of the tool assembly.

BRIEF DESCRIPTION OF THE DRAWINGS

The various advantages of the present invention will become apparent to those skilled in the art upon reading the following specification and by reference to the drawings in which:

FIG. 4 is a top view of apparatus made in accordance with the teachings of this invention shown machining a workpiece which is illustrated in cross section; and FIG. 5 is a front view of the apparatus shown in FIG. 4.

DESCRIPTION OF THE PREFERRED EMBODIMENT

Figure 1:
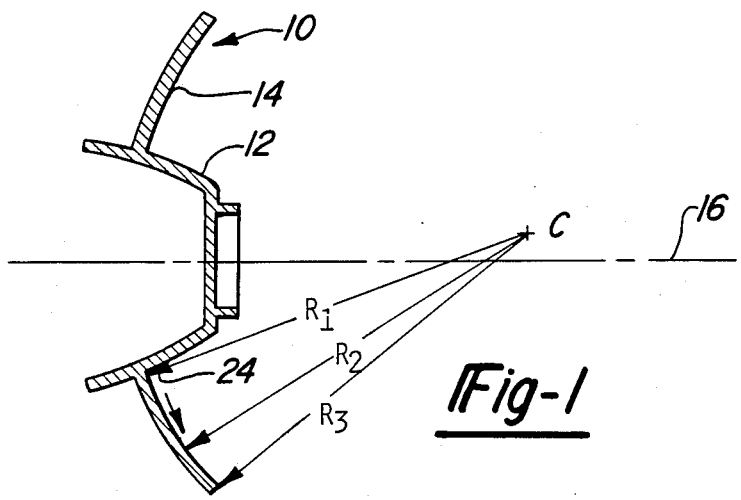
FIG. 1 is a top sectioned view of a workpiece to be machined in accordance with the teachings of the present invention.
Figure 2A:
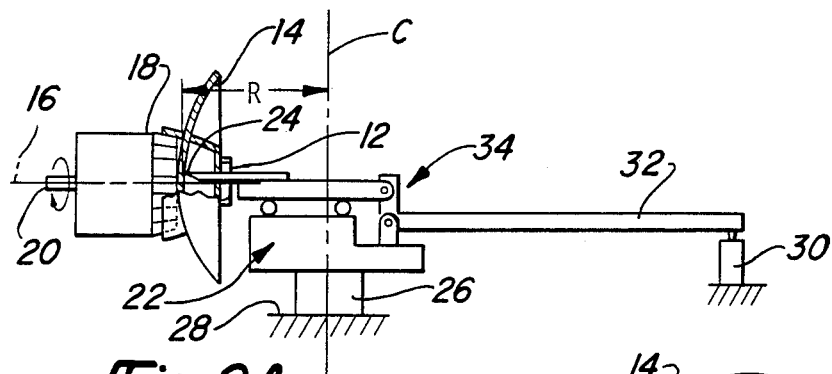
FIG. 2(A) is a diagrammatic front view of apparatus for making the aspheric surface in the workpiece and FIG. 2(B) is a diagrammatic side view thereof.
Figure 2B:
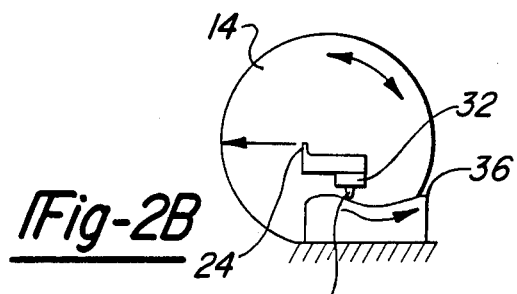
Figure 3:
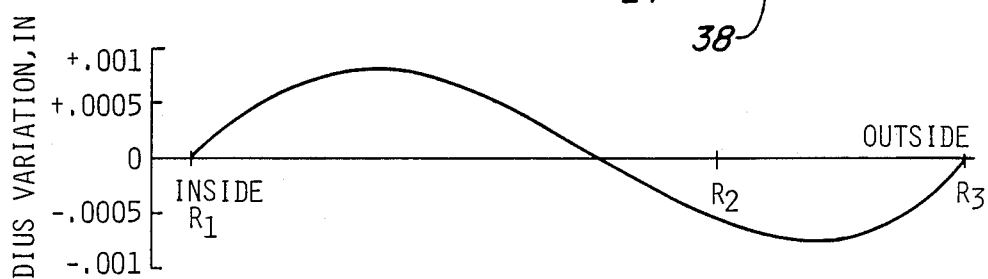
FIG. 3 is a graph illustrating the generally sinusoidal configuration of the cam surface.

The concepts involved in the present invention can be best understood by reference to FIGS. 1-3. This invention finds particular utility in making optical parts such as mirrors with aspheric surfaces. In particular, the invention will be described in connection with a workpiece 10 having a central hub 12 and a concave outer surface 14 where an elliptical mirror surface is desired to be formed. By way of a specific example, workpiece 10 can be made of aluminum stock and the original surface configuration for surface 14 is approximately spherical. Workpiece 10 is rotated about its major axis 16 by placing it in a suitable chuck 18 in a lathe spindle 20.

A tool assembly generally designated by the numeral 22 includes a diamond cutting tip 24 mounted at one end thereof. In FIG. 1 the cutting tip 24 is represented by the tip of the arrows. The tool assembly 22 is pivoted about an axis labeled "C" in the drawings. During operation, the cutting tip 24 moves in an arcuate path having a given instantaneous radius measured from the pivot axis C to the end of the cutting tip 24. The pivot axis C of the tool assembly is generally perpendicular to, yet spaced from the mirror axis 16. If the instantaneous radius is constant as the cutting tip 24 moves throughout its arcuate path from the position associated with radius $R_1$ to its finishing position at $R_3$, then the mirror surface 14 will be torodial. However, if the instantaneous radius is modulated slightly as the tool is pivoted about the C axis, a true elliptical surface can be generated.

FIG. 3 shows the variation of the instantaneous radii which is required to generate an elliptical surface as the cutting tip 24 moves from its inside position ($R_1$) to its outside position ($R_3$). These variations define a substantially sinusoidal configuration and the required variation for the instantaneous radii is very small, less than 0.001 inch for a 4 inch diameter mirror surface. Therefore, means are provided to generate small controlled variations in this instantaneous radii as the tool cutting tip moves in the arcuate path about point C. This should be accomplished very smoothly for optical parts which have tolerances often measured in millionths of an inch.

FIG. 2 diagrammatically illustrates a machine construction for performing this operation. The tool assembly 22 rests on a rotary support 26 which is in turn mounted on a fixed base 28. The rotary support permits the cutting tip 24 to rotate precisely about the C axis. The instantaneous radius of the cutting tip 24 from the C axis is adjusted or modulated by a plate cam 30 by means of a follower arm 32 and linkage 34. The cam surface 36 is generally sinusoidal in configuration and follows the contours of the variations as shown in FIG. 3. However, the lever arms in the follower arm 32 and linkage 34 are chosen such that motion of the cutting tool 24 is demagnified approximately 100 times. Assuming no loss of motion or "slop" in the mechanical linkage, the precision required for fabrication of the cam surface 36 is also demagnified by the same factor. That is, tool motion which is accurate to 10 millionths of an inch can be produced by a cam which is accurate to only 1 thousandths of an inch.

As the tool assembly 22 pivots about the C axis, the cam follower 38 moves along cam surface 36. The vertical variations in cam surface 36 are translated into horizontal movement of cutting tip 24 by way of linkage 34.

As a result, the instantaneous radii is adjusted as the cutting tip 24 moves along the arcuate path from its beginning to ending positions.

FIGS. 4 and 5 illustrate a presently preferred machine construction. To some extent, the same reference numerals are used in these figures as were used in the earlier mentioned figures.

The rotary support 26 preferably is a commercially available rotary air bearing support which provides rotation about the C axis which is accurate to about two microinches. The tool assembly 22 includes a base plate 40 whose lower surface is connected to the rotary air bearing 26. Onto upper portions of base plate 40 are mounted tool support member 42 and follower arm supports 44.

The follow arm support 44 includes two side plates 54 and 56. A vertical flexure plate 58 extends across the base plate 40 between side plates 54, 56. Flexure plate 58 has a horizontally extending relief 60 defining a flexure point 62 at its center. The left most end of follower arm 32 is fastened to top portions of flexure plate 58 of the follow arm support by way of fasteners 64. Middle top portions of plate 58 are cut out to provide linkage plate 66 with access to the bottom left hand portions of follower arm 32. Attachment is made by way of fasteners 68. Linkage plate 66 also includes a plurality of reliefs, one relief 70 having a flexure point 72 which is vertically aligned with flexure point 62 of relief 60 in the plate 58. The other end of linkage plate 66 is connected to the top of tool support 42 by fasteners 74. The diamond cutting tip 24 is also connected to the top of tool support 42 by tool holder block 78. The tool support 42 is generally rectangular in shape with an internal rectangular cut out 80 to define a generally parallelogram arrangement. As a result, the cutting tip is prevented from moving except in the desired horizontal direction.

The tool linkage plate 66 translates vertical movement of the follower arm 32 into horizontal movement of the cutting tip 24. The motion of the cutting tip is demagnified with respect to the motion of the cam follower 38 by the ratio A/B where A is the horizontal distance between the axis containing flexure points 62, 72 and the cam follower 38 and B is the vertical distance between the two flexure points 62 and 72. It will be noted that in the preferred construction that no conventional pivots are used in the tool assembly. All rotational motions are permitted by integral flexure pivots. This eliminates undesirable free motion or slop thereby providing the construction with good accuracy.

In operation, the workpiece 10 is rotated about its axis 16. The cutting tip 24 begins at the point shown in FIG. 4. As it pivots about point C in a counterclockwise direction the cam follower 38 rides along the cam surface 36. The cam surface 36 has the configuration shown in FIG. 3 so, as the cutting tip 24 is pivoted from the inside out, the first variation provided by the cam surface 36 is an upward motion. The follower arm 32 then rotates upwardly and the tool linkage plate 66 is forced to the left. This in turn moves the cutting tip 24 to the left and accomplishes the desired variation of the radius R from the cutting tip to the C axis. The variation of the radius R will continue to the left until the peak of the cam surface 36 is reached and then the cutting tip 24 will move to the right until the trough of the cam surface is reached. Then, the cutting tip 24 will be moved to the left until it eventually reaches the same radius at the final position as it had when it began the process. In such manner, a truly elliptical shape is provided for mirror surface 14.

The metal mirror part is preferably mounted on a suitable spindle and motor drive with its axis horizontal. Typically, a commercially available air bearing is also used as a work support spindle to provide the necessary high rotational precision required for holding the mirror blank during machining. The plate cam is preferably produced by diamond machining using a commercially available general purpose diamond turning machine. The plate cam 36 can be mounted to a support fixture which is then mounted to the work spindle of the turning machine. The diamond turning machine can be programmed to move in the proper horizontal path to trace out the desired shape on the plate cam as it rotates. For production use, the cam is preferably made of steel with a coating of electroless nickel to permit diamond turning.

It should be understood that while this invention has been described in connection with a particular example that those skilled in the art will realize that other modifications of the invention can be made without departing from its spirit and scope after having the benefit of reading the specification and following claims.

What is claimed is:

1. Apparatus for machining an aspheric surface in a workpiece, said apparatus comprising:

a cam surface;

workpiece holder means for rotating a surface of a workpiece about a given axis;

tool assembly means having a cutting tip mounted on one end thereof for removing material from the workpiece, the tool assembly means being pivotable about a pivot axis extending generally perpendicular to and spaced from the axis of rotation of the workpiece, the tool assembly further including a member extending from an opposite end thereof and engaging said cam surface; and means for pivoting the tool assembly about said pivot axis to carry the cutting tip along an arcuate path while substantially simultaneously moving the member along the cam surface; and adjustment means for translating movement of the member as it traverses across the cam surface into linear movement of the cutting tip relative to said pivot axis as it moves in its arcuate path to thereby change the instantaneous radius defined by the distance between the cutting tip and pivot axis so that the apparatus can form an aspheric surface in the workpiece.

2. The apparatus of claim 1 wherein said adjustment means comprises:

said cam surface being fixed and having a generally sinusoidal configuration;

a cam follower on said member and riding on the cam surface;

a follower arm connected at one end to the cam follower; and linkage means connected between the follower arm and the cutting tip for translating and demagnifying variations in the cam surface into changes in said instantaneous radius as the cam follower rides along the cam surface during pivotal movement of the tool assembly means.

3. The apparatus of claim 2 wherein said linkage means comprises:

a first flexure plate connected at one end to an end of the follower arm and at an opposite end to a base plate, said flexure plate including a relief defining a flexure point;

a linkage plate connected at one end to the end of the follower arm and at the other end to the tool assembly means, said linkage plate having a relief defining a flexure point vertically aligned with the flexure point in the first flexure plate whereby upward movement of the follower arm is translated and demagnified into horizontal movement of the cutting tip.

4. The apparatus of claim 3 wherein said base plate is mounted on a rotary air bearing and the tool assembly means further comprises:

a tool support member having a rectangular cut out providing a generally parallelogram configuration, lower portions of the tool support member being connected to an upper surface of the base plate;

a tool holder block connected to the upper surface of the tool support member, the cutting tip being connected to the tool holder block; and wherein said linkage plate is connected between the upper surface of the tool support member and lower end portions of the follower arm.

5. A method of making a mirror with an aspheric surface, said method comprising:

rotating a surface of a workpiece about a given axis;

providing a tool assembly having a cutting tip mounted on one end thereof;

pivoting the tool assembly about a pivot axis so that the tip moves in an arcuate path having a given instantaneous radius measured between the pivot axis and the cutting tip while substantially simultaneously causing an extension member of the tool assembly to ride over a cam surface; and adjusting the instantaneous radius as the cutting tip moves in the arcuate path by translating motion generated in the extension member by said cam surface into variations in the instantaneous radius thereby providing an aspheric surface in the workpiece.

6. The method of claim 5 wherein integral pivots are used to translate movement of a follower arm riding on the cam surface into changes in the instantaneous radius of the cutting tip.

7. The method of claim 5 wherein said cam surface is sinusoidal in configuration.

8. Apparatus for machining an aspheric surface in a workpiece, said apparatus comprising:

workpiece holder means for rotating a surface of a workpiece about a given axis;

tool assembly means having a cutting tip mounted on one end thereof for removing material from the workpiece, the tool assembly means being pivotal about a pivot axis extending generally perpendicular to and spaced from the axis of rotation of the workpiece whereby the cutting tip moves in an arcuate path having a given instantaneous radius measured between the pivot axis and the cutting tip;

adjustment means for adjusting said instantaneous radius as the cutting tip moves in the arcuate path to thereby form an aspheric surface in the workpiece, said adjustment means including a fixed cam surface, a cam follower riding on the cam surface, a follower arm connected at one end to the cam follower, and linkage means connected between the follower and the cutting tip for translating and demagnifying variations in the cam surface into changes in said instantaneous radius as the cam follower rides along the cam surface during pivotal movement of the tool assembly means, said linkage including a first flexure plate connected at one end to an end of the follower arm and at an opposite end to a base plate, said flexure plate including a relief defining a flexure point; a linkage plate connected at one end to the end of the follower arm and at the other end to the tool assembly means, said linkage plate having a relief defining a flexure point vertically aligned with the flexure point in the first flexure plate whereby upward movement of the follower arm is translated and demagnified into horizontal movement of the cutting tip;

a rotary air bearing onto which said base plate is mounted;

said tool assembly means further including a tool support member having a rectangular cut out providing a generally parallelogram configuration, lower portions of the tool support member being connected to an upper surface of the base plate; a tool holder block connected to the upper surface of the tool support member, the cutting tip being connected to the tool holder block; and wherein said linkage plate is connected between the upper surface of the tool support member and lower end portions of the follower arm.

9. The apparatus of claim 8 wherein said cam surface is sinusoidal in configuration.

10. Apparatus for machining an aspheric surface in a workpiece, said apparatus comprising:

a cam having a fixed cam surface with a given configuration;

workpiece holder means for rotating a surface of a workpiece about a given axis;

a rotary air bearing pivotal about a pivot axis extending generally perpendicular to the axis of rotation of the workpiece;

linkage means mounted to the air bearing and including at least one flexural pivot for translating vertical movement into horizontal movement;

a cutting tip connected to one end of the linkage means;

a follower arm connected between an opposite end of the linkage means and carrying a cam follower riding on the cam surface; and whereby the air bearing is pivoted about the pivot axis to carry the cutting tip along an arcuate path while substantially simultaneously moving the cam follower along the cam surface, with the linkage means translating upward movement of the cam follower into horizontal movement of the cutting tip to thereby adjust the instantaneous radius thereof as it moves in its arcuate path to thereby form an aspheric surface in the workpiece.

* * * * *